June 21, 1960 J. A. RAJCHMAN ET AL 2,942,240
MAGNETIC MEMORY SYSTEMS USING
MULTI-APERTURED STORAGE
ELEMENTS
Filed Sept. 13, 1954 4 Sheets-Sheet 1

INVENTORS.
Jan A. Rajchman
& Arthur W. Lo
BY
Morris ... [signature]
ATTORNEY.

June 21, 1960 J. A. RAJCHMAN ET AL 2,942,240

MAGNETIC MEMORY SYSTEMS USING MULTI-APERTURED STORAGE ELEMENTS

Filed Sept. 13, 1954 4 Sheets-Sheet 2

INVENTORS.
Jan A. Rajchman
& Arthur W. Lo
BY Morris L. Rakkin
ATTORNEY.

June 21, 1960 J. A. RAJCHMAN ET AL 2,942,240

MAGNETIC MEMORY SYSTEMS USING MULTI-APERTURED STORAGE ELEMENTS

Filed Sept. 13, 1954 4 Sheets-Sheet 3

INVENTORS.
Jan A. Rajchman
& Arthur W. Lo
BY Morris L. Raban
ATTORNEY.

June 21, 1960 J. A. RAJCHMAN ET AL 2,942,240

MAGNETIC MEMORY SYSTEMS USING MULTI-APERTURED STORAGE ELEMENTS

Filed Sept. 13, 1954 4 Sheets-Sheet 4

INVENTORS.
Jan A. Rajchman
& Arthur W. Lo
BY Morris Rakkin
ATTORNEY.

United States Patent Office 2,942,240
Patented June 21, 1960

2,942,240

MAGNETIC MEMORY SYSTEMS USING MULTI-APERTURED STORAGE ELEMENTS

Jan A. Rajchman, Princeton, and Arthur W. Lo, Elizabeth, N.J., assignors to Radio Corporation of America, a corporation of Delaware Filed Sept. 13, 1954, Ser. No. 455,726

34 Claims. (Cl. 340—174)

This invention relates to magnetic memory systems, and particularly to fast, random-access, magnetic memory systems.

One of the most important criterions of a random-access internal memory in present-day computing and information-handling systems or machines is its speed of operation, that is, the rate at which information can be read into and out of the memory. This attribute of a memory is called access time. It is understood that the efficiency and speed of operation of electronic information-handling and computing machines may be improved by decreasing the access time.

In modern magnetic memories, for example, such as the one described in an application Serial No. 375,470, filed by Jan A. Rajchman and Richard O. Endres entitled "Memory System," now Patent No. 2,784,391, issued March 5, 1957, the information may be stored as "bits" (a binary digit of information). One bit is stored in each core as a selected one of two remanent states. In order to read out from a selected core, a test is made by driving the core to one state. If the core is already in this one state, there is no output. If the core is not in this one state, but in the opposite state, a large output signal is derived. To retain storage of the bit, the core is now restored to its previous one state. To so restore the core, however, requires additional time. In most apparatus, for example, that mentioned above, there is no reading-in of new information simultaneously with the reading-out of information already stored. On the contrary, the writing-in circuits are reserved for storing the state of the cores during the reading process. It is desirable to write and read information at different memory positions simultaneously in order to permit a greater speed of operation, as well as greater flexibility, in the use of a memory system.

Therefore, it is an object of this invention to provide an improved memory system characterized by the non-destructive read-out of stored information.

A further object of this invention is to provide a novel fast-access magnetic memory system wherein information may be written into and read out of different locations simultaneously.

Another object of this invention is to provide an improved, fast, random-access, magnetic memory which is relatively easy to construct.

The magnetic material employed in the present invention is characterized by a substantially rectangular hysteresis loop. The term rectangular hysteresis loop is descriptive of the shape of the curve derived from a plot of the magnetizing force H along a horizontal axis (for symmetrically equal values and opposite polarities of H) versus the corresponding magnetic induction (B) along a vertical axis for a given sample of magnetic material. As the amplitude of the magnetizing force is increased, the hysteresis loop approaches a limiting curve termed the major loop. The intersection of the upper horizontal portion of the major hysteresis loop with the vertical magnetic induction axis is taken herein to represent one state (P) of saturation at remanence, and the intersection of the lower horizontal portion of the major hysteresis loop with the magnetic induction axis is taken herein to represent the opposite state (N) of saturation at remanence. A suitable magnetic material may be a ceramic-like, ferromagnetic spinel such as manganese-magnesium ferrite.

A family of minor hysteresis loops, similar in shape to the major hysteresis loop, may be obtained by using different maximum values of magnetizing force. For each loop of the family of minor loops, the material also has two states (P or N) of saturation at remanence represented by the intersections of the upper and lower horizontal portions of that minor loop with the vertical flux axis.

There are two senses of flux flow around a closed flux path. A positive current into a surface bounded by the path produces a clockwise flux flow. One state (P) of saturation at remanence, with reference to a closed flux path, is that in which the saturating flux is directed in a clockwise sense (as viewed from one side of the surface) around the closed path, and the other state (N) of saturation at remanence is that in which the saturating flux is directed in the counter-clockwise sense (as viewed from the same side of the surface) around the closed path.

By way of example, the above and further objects of the present invention are carried out in a particular embodiment by providing a two-dimensional array for storing binary digits. The arrays are fabricated from a substantially rectangular hysteresis loop magnetic material. Each of the two-dimensional arrays is provided with one or more ($m$) clusters of apertures for storing "$m$" binary digits. Each cluster includes at least one aperture for writing information, an aperture for reading information, and a spacing aperture to prevent interaction between adjacent clusters. A plurality of the two-dimensional arrays are stacked together in sandwich-like fashion to form a three-dimensional magnetic memory.

There are three distinct closed flux paths included in each cluster of apertures. One flux path is taken around the reading aperture and includes two different portions, each respectively common to one of the other two flux paths. A binary "zero" may be represented in a cluster of apertures by exciting the two different portions of the magnetic material in the flux path taken around the reading aperture to the same state of saturation at remanence; and a binary "one" may be represented by exciting the two different portions of the magnetic material in the flux path taken around the reading aperture to opposite states of saturation at remanence.

If the two different portions of the magnetic material in a reading aperture flux path are at opposite states of saturation at remanence, with respect to this path, an alternating magnetizing force around the reading aperture does not produce a flux change in the flux path around the reading aperture. On the other hand, if the two different portions of the magnetic material in a reading aperture flux path are at the same state of saturation at remanence with respect to this flux path, a first magnetizing force of proper polarity produces a considerable change of flux in the flux path around the reading aperture, and the states of saturation at remanence of the different portions are reversed. If the first magnetizing force is followed by a magnetizing force of opposite polarity, the two different portions of the reading aperture flux path are restored to their initial state of saturation at remanence. A flux flow around the reading aperture is detected by a read winding which links the magnetic material limiting the reading aperture. Consequently, by utilizing a magnetizing force of one polarity followed by a magnetizing force of opposite polarity, a stored binary digit may be read out of a selected cluster indefinitely without the destruction of the stored information.

A binary digit is written into a selected cluster by establishing a flux flow in the flux path around the writing apertures. The information may be considered as stored in a portion of the magnetic material about the writing aperture. The state of this portion does not change during read-out. Reference may also be made to our copending application, Serial No. 455,725, entitled Magnetic Systems, filed concurrently with this application. The flux flow around the writing aperture does not induce a voltage in the output winding. Therefore, the write-in and read-out are independent and both write-in and read-out can be performed simultaneously.

Other embodiments of the present invention include multiapertured clusters for obtaining various output signals in accordance with the written information.

The novel features and advantages of this invention, as well as the invention itself, will best be understood from the following detailed description when read in connection with the accompanying drawing in which:

Figure 1*a* is a plan view of a two-dimensional array comprising an apertured plate in which each cluster includes three apertures;

Figure 1*b* is a cross-sectional view of the plate of Figure 1*a* taken along the line **1*b*—1*b***;

Figure 5A:
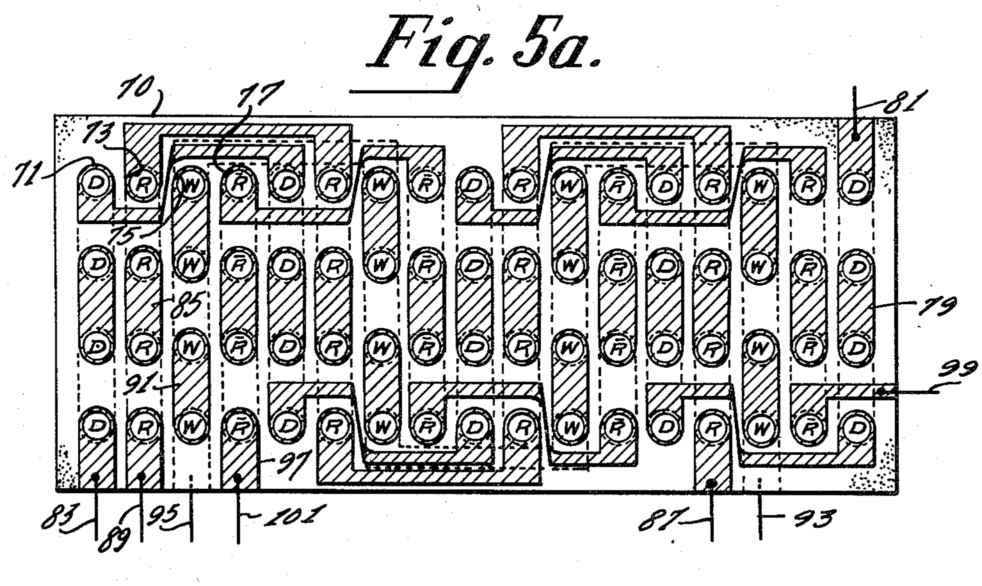
Figure 5B:
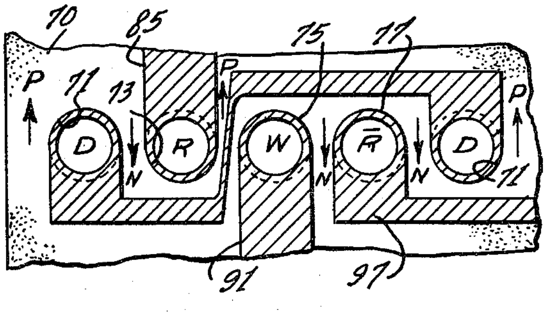
Figure 6:
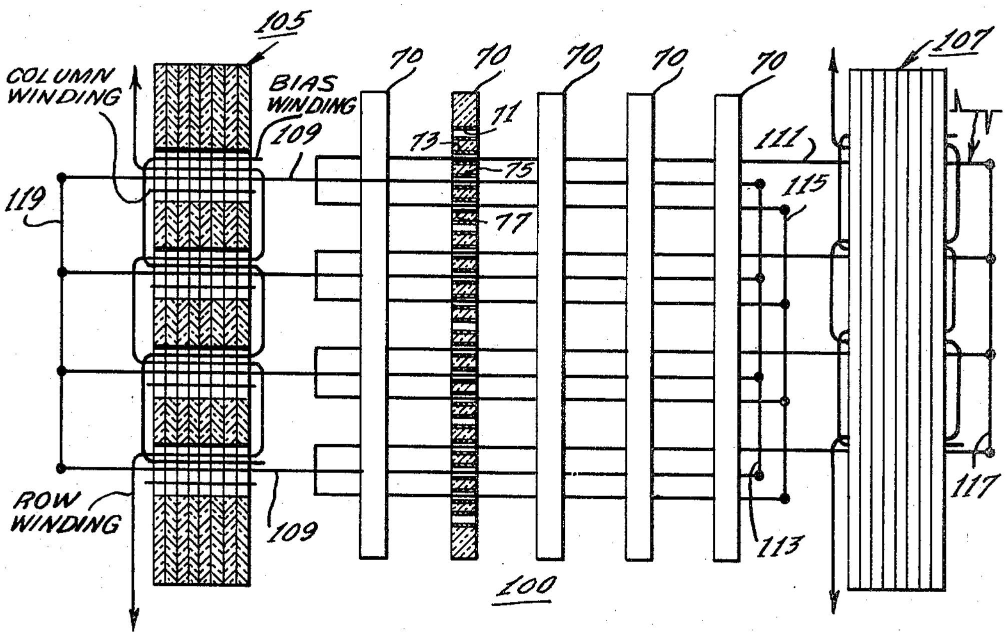

Figure 5*a* is a plan view of a two-dimensional array according to an embodiment of the present invention;

Figure 5*b* is a plan view of a cut-away portion of the two-dimensional array of Figure 5*a* which illustrates a method of writing a binary zero into the upper left-hand cluster of the array;

Figure 6 is a cross-sectional view of a plurality of two-dimensional arrays arranged in a three-dimensional magnetic memory system.

Figure 1A:
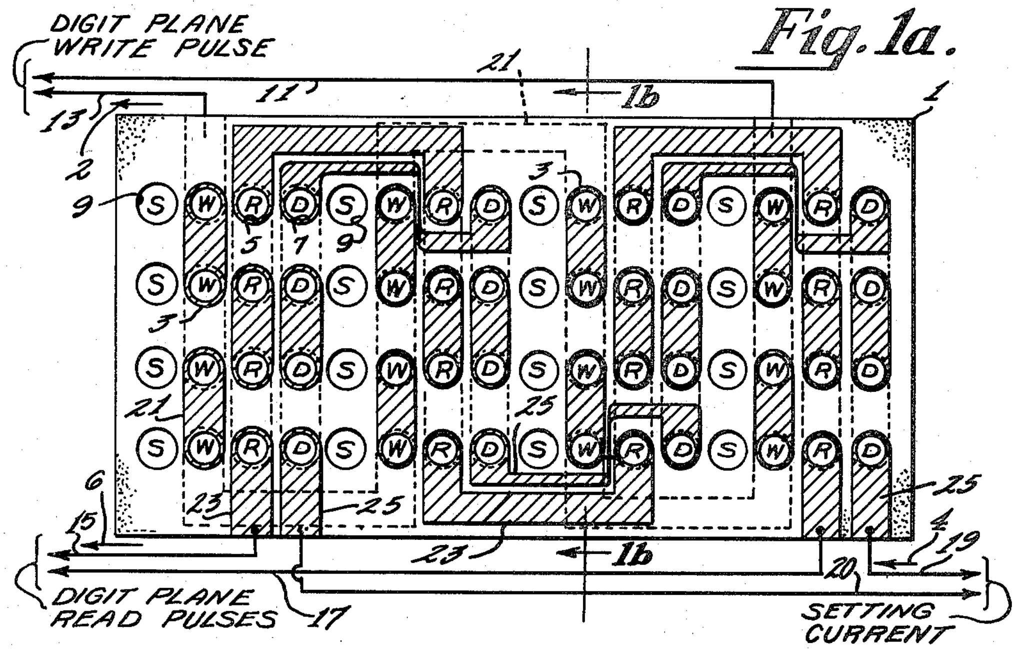

Referring to Figure 1*a*, there is shown, by way of an example, a two-dimensional array comprising a plate 1 of a magnetic material which is provided with a 4 x 4 array of clusters, the array being capable of storing sixteen different binary digits. Each cluster includes a writing (W) aperture 3, a reading (R) aperture 5, and a reference or dummy (D) aperture 7. A spacer (S) aperture 9 is provided intermediate each cluster. The spacer aperture 9 serves the purpose of eliminating interaction between adjacent clusters.

A write winding 21, which is comprised of a conductive coating on the surfaces of the plate 1, links the magnetic material limiting each of the writing apertures 3. The inside walls of the writing apertures 3 are coated by this conductive coating which is made to weave back and forth through each of the writing apertures 3 to form a checkerboard winding. The advantages of the checkerboard arrangement are explained hereinafter. A read winding 23, comprised of a different conductive coating on the surfaces of the plate 1, links the magnetic material limiting each of the reading apertures 5 in a checkerboard fashion similar to the write winding 21. A dummy winding 25, comprised of a still different conductive coating on the surfaces of the plate 1, links the magnetic material limiting each of the dummy apertures 7 in a checkerboard fashion similar to the write winding 21 and the read winding 23.

Conductors 11 and 13 connect the write winding 21 to a current source (not shown) which supplies a write current pulse. Conductors 15 and 17 connect the read winding 23 to a device which is responsive to the pulses induced in the read winding 23. Likewise, the conductors 19 and 20 connect the dummy winding 25 to a D.C. (direct current) source (not shown) which supplies an excitation current for setting the magnetic material limiting the dummy apertures 7 to a reference state of saturation at remanence. The setting of the magnetic material limiting the dummy apertures 7 is in the nature of a fabrication step, and it is not necessary to reset the magnetic material limiting the dummy apertures 7 because the material remains saturated at remanence in the reference state indefinitely.

Note, for any given cluster of the array, that currents flowing in the directions shown by the arrows 2, 4, 6 all pass through the apertures of a given cluster in the same direction (i.e. into or out of the surface as viewed in the drawing). Also note that the direction of the currents reverses in the adjacent clusters of a column and in the adjacent clusters of a row.

Typically, the plate 1 may be molded from the powder-like, manganese-magnesium, ferrite material and annealed at a suitable temperature to obtain the desired magnetic characteristics. Because of the extremely low electrical conductivity of the magnetic material, the conductive coatings constitute a particularly suitable method for forming the various windings. Also the checkerboard arrangement is relatively simple to fabricate by a coating technique. Techniques for applying conductive coating to the surface of a plate are described in a copending application Serial No. 455,724, by Jan A. Rajchman entitled "Magnetic Storage Device" which is filed concurrently herewith. A conductive coating may be sprayed or evaporated onto both of the surfaces of the plate, including the inside walls of the apertures. During the coating operation masks are used to cover an entire surface area with the exception of the areas reserved for the particular windings. An alternative method of applying the conductive coating may be that of entirely covering both surfaces of the plate, including the inside surfaces of the apertures, with a conductive coating and then removing or etching all the coating, except for the portions of the coating which constitute the various windings. Suitable methods for applying the conductive coating are described in the aforementioned application Serial No. 455,724.

The conductive coating may be replaced by corresponding wires which are threaded back and forth through the apertures. However, the coating and method of application are advantageous for ease of application, etc.

Figure 1B:
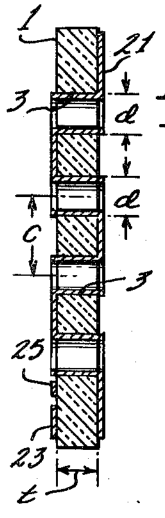

Figure 1*b* is a cross-sectional view of the plate 1 taken along the line **1*b*—1*b* and illustrates the manner in which the write winding 21 weaves back and forth through each of the writing apertures 3 of a vertical column of clusters. A portion of the read and dummy windings 23 and 25** are also shown.

The thickness "*t*" of the plate 1 may be in the order of 40 to 50 thousandths of an inch. The choice of thickness is influenced by the mechanical strength of the magnetic material and by the amount of flux change desired for a given excitation current pulse. It is not essential that the plate 1 be of uniform thickness throughout. A relatively large tolerance in thickness is permissible. Each of the apertures 3, 5, 7 and 9 of the plate 1 may be of a diameter "*d*," and the center-to-center spacing of the corresponding apertures of adjacent vertical clusters in a column may be of a value "*c*." In practice, the diameter "*d*" of each aperture is chosen so as to allow the greatest packing density for a plate of given dimensions.

In aforesaid copending application Serial No. 455,725, there is described a transfluxor for storing a binary digit, which device is characterized by non-destructive read-out.

In one particular embodiment, the transfluxor is constituted by a body of magnetic material saturated at remanence and having at least three apertures. A plurality of flux paths are provided, one flux path being taken around each aperture. A selected flux path of the transfluxor includes two different portions of magnetic material capable of being saturated either at the same state or opposite states of saturation at remanence. The selected flux path is the one taken around an aperture termed herein the reading aperture. One of the portions of magnetic material of the selected flux path is common to the reading and the writing apertures, and another portion of magnetic material of the selected flux path is common to the reading aperture and to an aperture termed herein a "dummy" aperture. Thus, each cluster of apertures (3, 5, 7) of the plate 1 is a transfluxor device.

The method of writing in and reading out a binary digit may be best illustrated with reference to Figure 2, which is a perspective view of a segment 30 of a two-dimensional array such as the plate 1 of Figure 1.

Each cluster comprising a writing aperture 3, a reading aperture 5 and a dummy aperture 7 serves to store one binary digit. The write, read and dummy windings 21, 23, and 25, respectively link the magnetic material limiting each of the writing apertures 3, the magnetic material limiting each of the reading apertures 5 and the magnetic material limiting each of the dummy apertures 7, as shown in the plate 1 of Figure 1*a*. An individual write address wire 31 is threaded through each of the writing apertures 3, and an individual read address wire 33 is threaded through each of the reading apertures 5.

For convenience of description, the flux flow caused by an excitation current pulse may be considered to be concentrated in the flux path taken around the aperture threaded (or linked) by the current-carrying conductor. Because the hysteresis loop of the magnetic material is not perfectly rectangular, some flux flows around the longer path including two or more apertures. However, the amplitude of the excitation current pulse in this particular embodiment is chosen such that the flux flow in the longer path is negligible and can be disregarded. Also, the leakage flux is a negligible amount. The sense of flux flow in a path as the result of an applied current may be determined by the well-known right-hand rule.

Figure 2:
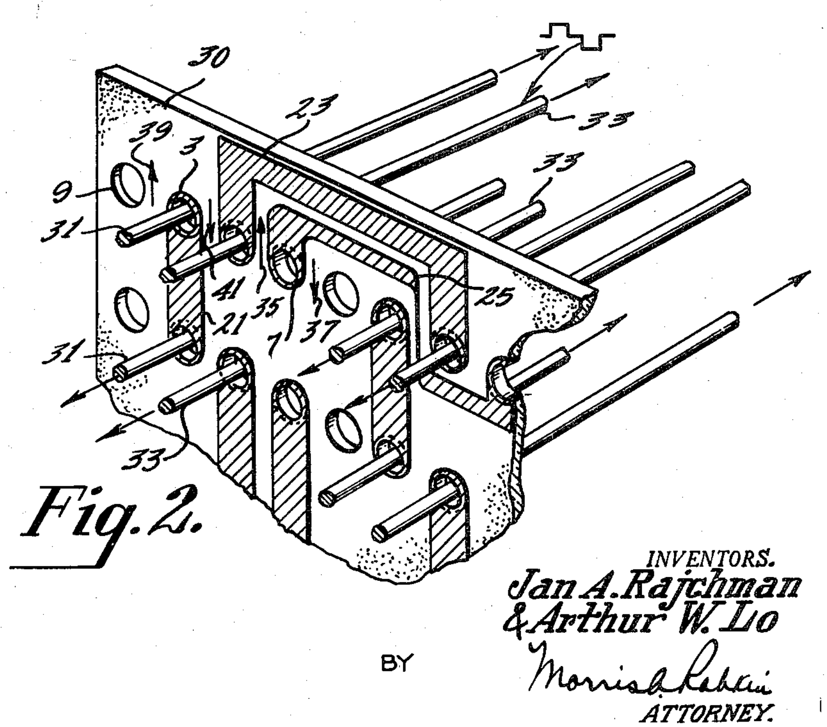
Figure 2 is a perspective view of a segment of a typical two-dimensional array and the respective write and read address wires.

Consider now the cluster shown in the upper left-hand corner of the segment 30 of Figure 2. Assume that a positive excitation current pulse was previously applied in the direction of the arrow 4 to conductor 19 of the dummy winding 25, which weaves back and forth through the dummy apertures 7. Accordingly, a clockwise (with reference to the dummy aperture 7) flux is established around the dummy aperture 7 of the upper left-hand cluster, as shown by the arrows 35 and 37 respectively.

The current-coincidence method of writing-in a binary digit may be used. For example, to write the binary digit, which may be a "one," a positive current pulse of substantially one-half the amplitude of an excitation current pulse is applied to the write winding 21 which weaves back and forth through all the writing apertures 3. Positive direction of current flow in each cluster of apertures is indicated by the arrows on the wires 31 and 33. This half-amplitude current pulse by itself has relatively little effect on the magnetic material limiting the individual writing apertures 3. At the same time, however, a similar positive half-amplitude current pulse is applied to the one write address wire 31 which threads the selected cluster, for example, that threading the writing aperture 3 of the upper left-hand cluster. Therefore, only the writing aperture 3 of the upper left-hand cluster receives a full excitation current pulse and accordingly the binary digit is written into only the upper left-hand cluster.

A clockwise (with reference to the writing aperture 3) flux is established around the writing aperture 3 of the upper left-hand cluster, as shown by the arrows 39 and 41.

Note the state of the magnetic material limiting the reading aperture 5 of the upper left-hand cluster. One portion is at the state N of saturation at remanence with reference to reading aperture 5, as shown by arrow 41, and the other portion is also at the state N of saturation at remanence with reference to reading aperture 5, as shown by arrow 35. Accordingly, both portions are at state N of saturation at remanence because the sense of flux in both portions, with reference to reading aperture 5, is counter-clockwise. If, now, an excitation current pulse of suitable polarity, i.e. positive, is applied to the one read address wire 33, which threads the reading aperture 5 of the upper left-hand cluster, the state of the two different portions of the magnetic material limiting the reading aperture 5 is reversed to the state P of saturation at remanence. Likewise, if the positive excitation current pulse is followed by a negative excitation current pulse, the two different portions of the magnetic material limiting the reading aperture 5 of the upper left-hand cluster are returned to their original state N of saturation at remanence, as shown by arrows 41 and 35.

Upon each reversal of the magnetic material limiting the reading aperture 5 of a selected cluster, a voltage is induced in the read winding 23 which links a portion of the magnetic material limiting each of the reading apertures 5.

Accordingly, a binary one may be represented by the states of saturation at remanence of the two different portions of the magnetic material limiting a reading aperture, as shown by arrows 41 and 35. A binary zero may be written into a selected cluster by applying a half-amplitude negative excitation current pulse both to the write winding 21 and to the write address wire 31 of the selected cluster. Thus, when a binary zero is written into the upper left-hand cluster, a counter-clockwise flux is established around the writing aperture 3. However, the sense of this flux is clockwise with reference to the reading aperture 5; therefore, a portion of the magnetic material limiting the reading aperture 5 is in a state N of saturation at remanence, and a different portion is in a state P of saturation at remanence with respect to the reading aperture 5. Consequently, if a positive or negative current pulse is applied to the read address wire 33, which threads the reading aperture 5 of the upper left-hand cluster, the states of saturation at remanence of the two different portions of the magnetic material limiting the reading aperture 5 remain unaltered. There is no reversal of the magnetic flux because the continuity of flux flow requires an equal and opposite change of flux in both portions of the magnetic material when a flux flow occurs. But, in the case of a binary zero, one or the other of the portions of the magnetic material limiting the reading aperture 5 is already saturated in the sense of the magnetizing force clockwise or counter-clockwise. The schedule of a positive excitation current pulse, followed by a negative excitation current pulse, then, does not produce a change of flux and no voltage is induced in the read winding 23 which is coupled to each of the reading apertures 5.

Figure 3:
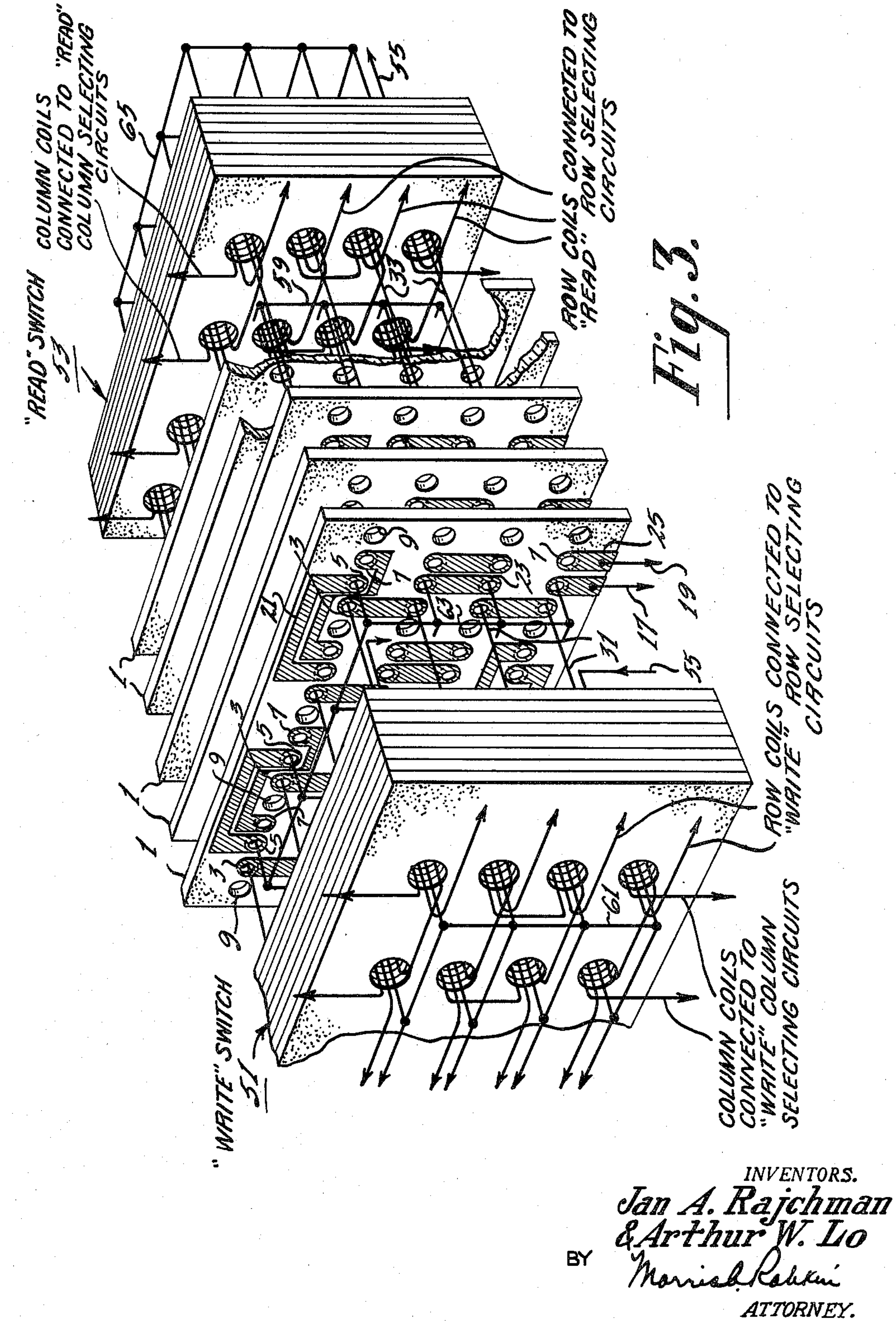
Figure 3 is a perspective view of a plurality of two-dimensional arrays with separate write and read address switches, the arrays and switches being arranged in a three-dimensional memory system.

Figure 3 is a perspective view of one embodiment of a three-dimensional magnetic memory system according to the present invention. A plurality of two-dimensional arrays comprising the apertured magnetic plates 1, which are similar to the two-dimensional array described in connection with Figure 1*a*, are provided. Each of the two-dimensional arrays illustratively includes a 4 x 4 array of binary-digit storing clusters, and each of the clusters includes a writing aperture 3, a reading aperture 5, and a dummy aperture 7. A spacer aperture 9 is located intermediate adjacent clusters. One end of the write winding 21 is connected to conductor 11 (as shown in Fig. 1*a*) and the other end of the write winding 21 is connected to conductor 13 (as shown in Fig. 1*a*). The conductors 11 and 13 are connected to a source (not shown) of excitation current pulses. One end of each of the read windings 23 of Figure 3 is brought out to a conductor 17 (as shown in Fig. 1*a*) and the other end of the read winding 23 is brought out to a conductor 15 (as shown in Fig. 1*a*). The conductors 15 and 17 are connected to a device (not shown) which is responsive to voltage pulses induced in the respective read windings. One end of the dummy winding 25 is brought out to a conductor 19, and the other end of the dummy winding 25 is brought out to a conductor 21, as shown in Fig. 1*a* or in Figure 3.

Separate write and read windings are supplied for each of the two-dimensional arrays of Fig. 3. Separate current sources and detection devices (not shown) are connected respectively to each write and read winding. A write switch 51 and a read switch 53 are provided. The write and read switch portions of the memory may be provided with selecting, output, and biasing coils coupled to all the cores therein in a fashion similar to that described in aforesaid Patent No. 2,784,391. For example, the write switch 51 has a plurality of magnetic cores positioned in an array wherein each row of cores is coupled to a separate row coil, and each column of cores is coupled to a separate column coil. The D.C. biasing coil 55 is coupled to all the cores of the write switch 51 and a D.C. biasing coil 55' is coupled to all the cores of the read switch 53. Each core of the write switch 51 has a write address wire 31 coupled thereto, and each core of the read switch 53 has a read address wire 33 coupled thereto. The row coils, the column coils and the biasing coils are arranged in a checkerboard fashion exactly as are the windings of the memory-digit planes 1. Therefore, the correct polarity excitation pulses for any given cluster of a two-dimensional array are always supplied by the write and read switches 51 and 53. In the following description of the various embodiments of the invention, one memory position is described: and it is understood that excitation pulses required for a different memory position are supplied by the read and write switches. The plurality of two-dimensional arrays are spaced apart and positioned parallel to each other with corresponding clusters substantially in alignment. The write address wires 31 of the write switch 51 may be comprised of short, straight pieces of insulated wire, a different write address wire being passed through the corresponding writing apertures 3 of a group of aligned clusters of the apertured plates 1. Likewise, the read address wires 33 may be comprised of short, straight pieces of insulated wire, a different read address wire being passed through the corresponding reading apertures 5 of a group of aligned clusters of the apertured plates 1. All of the write address wires 31 are connected in parallel at the read switch end of the system by a common connection 59; the write wires 31 are also connected in parallel at the write switch end of the system by means of a common connection 61. Likewise, all of the read address wires 33 are connected in parallel at the write switch end of the system by means of a common connection 63, and at the read switch end of the system by means of a common connection 65.

Selection of any desired core of a read or write switch for excitation is made by simultaneously applying a current from suitable selection circuits, indicated by legend, to the one-row core and the one-column core which intersect and are coupled to the desired core. A D.C. bias (not shown) is applied to the biasing coils 55 and 55' and operates to maintain all the cores of the switches at a given state of saturation. The excitation applied to the row coil and column coil which are selected overcomes both the D.C. bias and the coercive force of the selected core, and further provides the energy to drive the coupled load.

When a write or read switch core is driven from state N to state P, it induces a voltage in the corresponding write or read address wire which is coupled thereto. As soon as the excitation is removed from the row and column coils, the biasing coil operates to drive the selected core back to its N state of saturation, thereby inducing a voltage of opposite polarity in the wire or read address wire coupled thereto.

Current which flows in one direction in a write address wire 31, which is coupled to the selected core of the write switch 51, returns via the common connection 59 at the memory end of the system, through all the other write address wires 31, and through the common connection 61, at the switch end of the system, back to the originating switch core. There passes through each write aperture 3 in each one of the apertured plates 1: (1) the write address wire 31 from the write switch 51, and (2) the memory-digit plane write winding 21. Current which flows in a read address wire 33, which is coupled to a selected core of the read switch 53, returns via the common connection 63 at the memory end of the system, through all the read address wires 33, and through the common connection 65, at the read switch end of the system, back to the originating read core. There passes through each read aperture 5 of each cluster in each of the apertured plates 1: (1) the read address wire 33 from the read switch 53, and (2) the memory-digit plane read winding 23.

In order to write a word consisting of a number of binary digits into a given memory position, the following procedure may be used: a positive D.C. (direct current) setting current is applied to the conductors 19, 21 of each of the apertured plates 1 (Figure 1*a*). The excitation current thus supplied to the dummy winding 25 excites the portion of magnetic material common to the dummy aperture 7, and the reading aperture 5 of each of the clusters of each apertured plate 1 to a reference state of saturation of remanence; for example, state N (with reference to the reading aperture 5) as described in connection with the upper left-hand cluster of Figure 2.

The write switch core is selected, as previously described, by applying a current excitation to the row coil and column coil which intersect in the selected write core. The addressed switch core is driven, for example, from state N to state P, thereby inducing an output voltage in the selected write address wire 31. A corresponding positive excitation current pulse flows in the selected write address wire 31. The amplitude of the positive excitation current pulse is sufficient to excite the portion of the magnetic material common to the writing apertures 3 and the reading apertures 5 to the N state of saturation at remanence with reference to the reading aperture 5. Note that the binary digit is written into the cluster in a somewhat different manner from that explained in the method described, by way of example hereinabove, in connection with Fig. 2. The removal of the drive currents applied to the write switch 51 row and column coils is made at a rate which is less than the rate of application. The D.C. current in the biasing coil of the write switch 51 starts returning the selected switch core from state P to state N when the currents applied to the switch row and column coils are reduced. Therefore, the amplitude of the voltage induced in the output coil is reduced correspondingly, and the amplitude of the corresponding negative excitation current flowing in the selected write address wire 31 is insufficient to excite the portions of the magnetic material limiting the writing apertures 3 of the aligned clusters to the opposite state of saturation at remanence.

It will be recalled that the states of saturation at remanence of the portions of the magnetic material limiting the reading apertures of the clusters threaded by the selected write address wire 31 correspond to a binary one, as described, by way of example, in connection with the upper left-hand cluster of Fig. 2. A binary zero is written into the selected clusters of a selected group of memory digit planes by applying a negative current pulse of one-half the amplitude of a full excitation current pulse to the write conductors 11, 13 of the selected group of apertured plates 1 during the time interval in which the negative excitation current pulse is flowing in the selected write address wire 31. The combined effect of the write address current pulse and the write current pulse of the digit plane write winding 21 is sufficient to reverse the states of saturation at remanence of the portions of magnetic material limiting the write apertures 3 of the selected clusters. The states of saturation at remanence of the portions of magnetic material limiting the writing apertures of the remaining clusters of the selected apertured plates 1 are unchanged by the excitation current applied to the write conductive coating.

To read or interrogate a memory position, a switch core of the read address switch 53 is addressed in the manner described for writing, for example, by driving a selected read core from state N to P state of saturation. Voltage is induced in the coupled read address wire 33 and the corresponding full amplitude, positive excitation current is applied to the magnetic material limiting the reading apertures 5 which are threaded by the selected read address wire 33. The voltage induced in the separate read windings 23 as a result of the positive read excitation current pulse is observed. A high voltage in a read winding means that a binary one is stored in the selected cluster of the memory-digit plane. A low voltage (by "low" is meant that the amplitude is in the order of five or more times less than the amplitude of a high voltage) or the absence of voltage means that a binary zero is stored in the selected cluster of the memory-digit plane.

The drive currents applied to the row and column coils of the selected read switch core are reduced at the same rate at which they were applied. Consequently, the opposite polarity voltage induced in the coupled read address wire 33 causes a full amplitude, negative excitation current pulse to flow, and the states of the portions of the magnetic material limiting the reading apertures 5 of the selected clusters, wherein a binary one is stored, are returned to their initial states. Neither the positive nor the negative excitation current pulses affect those clusters wherein a binary zero is stored.

The function of the common connections 59, 61 and 63, 65, for the write and read address wires respectively, is to minimize the effects of currents induced in adjacent address wires due to the excitation current flowing in the selected write or read address wire, because a cancellation of the induced voltages results from the return currents which flow in the opposite direction in the address wires.

Other methods of writing in and reading out of a memory position may be employed. For example, the row and column current pulses applied to the write switch 51 may be reduced at the same rate at which they were applied, thereby furnishing alternate positive and negative full-amplitude excitation current pulses to the selected write address wire 31. During the interval when the negative excitation current pulse is flowing in the selected write address wire 31, a half-amplitude positive excitation current pulse is applied to the write winding 21 of those two-dimensional arrays wherein a binary one is to be stored. The half-amplitude positive excitation current pulse inhibits the reversal of the saturation states of the magnetic material limiting the writing apertures 3 of the clusters in which a binary one is to be stored.

The characterization of the excitation current pulses as half-amplitude is for the purpose of illustrating that the combined effect on the magnetic material of two coincident, half-amplitude current pulses equals the effect of a full-amplitude current pulse. This combined effect provides a magnetizing force beyond the knee of the hysteresis loop of the material.

The double coincidence switches 51 and 53 may be replaced by other types, for example, switches such as those described in an article by Jan A. Rajchman, in the RCA Review, vol. XIII, pp. 183–201, June 1952, entitled "Static Magnetic Matrix Memory and Switching Circuits."

The reversal of the states of saturation at remanence of the magnetic material limiting the writing apertures 3 of the selected clusters does not induce a voltage in the corresponding read windings 23. Likewise, the reversal of the states of saturation at remanence of the magnetic material limiting the reading apertures 5 does not influence the write-in currents. Consequently, a binary word can be written into one memory position simultaneously with a read-out of a binary word from a different memory position. Therefore, the write switch 51 and the read switch 53 and their associated selecting circuits are simultaneously operable. Write-in at one address (that is, memory position) and read-out at another address may proceed simultaneously. However, simultaneous write-in and read-out of the same memory position is not desirable because the portion of the magnetic material common to the reading and writing apertures of a cluster may be reversed both for write-in and read-out and, therefore, the read-out would be ambiguous.

Figure 4:
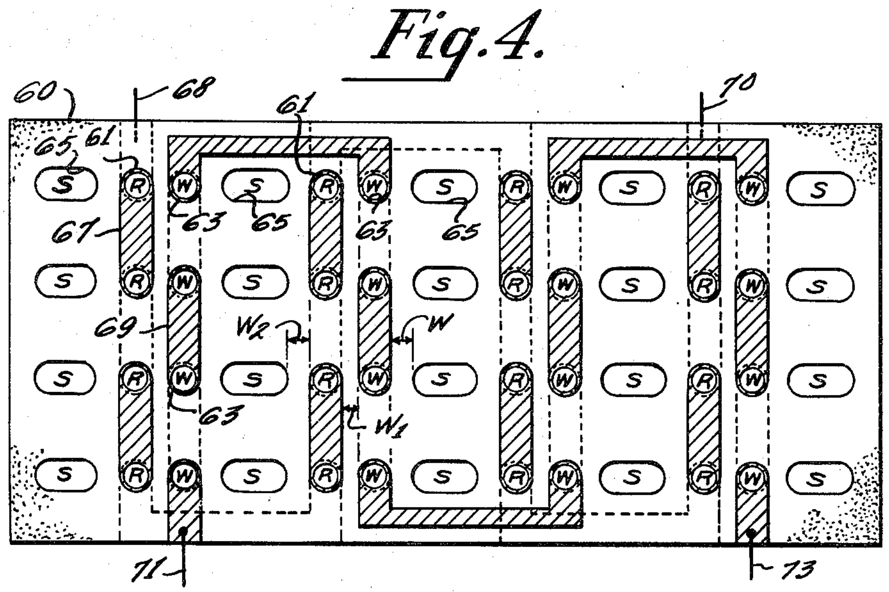
Figure 4 is a plan view of a two-dimensional array comprising an apertured magnetic plate in which a cluster of two apertures is used for storing each binary digit.

Referring to Figure 4, a two-dimensional array comprising an apertured plate 60 has provision for storing 16 binary digits in a 4 x 4 array of clusters. In this embodiment, each digit-storing cluster is comprised of a reading aperture 61 and a writing aperture 63. The spacer aperture 65 is provided to prevent cross-talk between adjacent clusters. A read winding 67, which is comprised of a conductive coating on the surfaces of the plate 60, links the magnetic material limiting each of the reading apertures 61. Again, the inside walls of the reading apertures 61 are coated by the conductive coating which is arranged in a checkerboard fashion. One end of the read winding 67 is brought out to a conductor 68, and the other end of the read winding 67 is brought out to a conductor 70. A write winding 69, which is comprised of a different conductive coating on the surfaces of the plate 60, links the magnetic material limiting each of the writing apertures 63. The write winding 69 weaves back and forth through the writing apertures 63 in a checkerboard fashion. One end of the write winding 69 is brought out to a conductor 71, and the other end of the write winding 69 is brought out to a conductor 73. The conductive coatings which constitute the write and read windings on the plate 60 may be applied in the manner previously described in connection with Figure 1*a*. Note that the cross-sectional width "W" of the magnetic material, which is common to a writing aperture 63 and an adjacent spacer aperture 65, is equal to or greater than the sum $(W_1+W_2)$ of the cross-sectional widths of the magnetic material $(W_1)$ common to a reading and a writing aperture of a cluster, and the magnetic material $(W_2)$ common to a spacer aperture and an adjacent reading aperture. The spacer apertures 65 are illustrated as being elongated; however, other configurations, such as circular, may be employed.

The method of storing a binary digit in an individual cluster of two apertures is described in detail in the aforementioned copending application Serial No. 455,725.

Briefly, one method is as follows: A selected flux path is taken around the reading aperture 61 of a cluster. When a relatively intense, magnetizing force is applied to the magnetic material limiting the writing aperture 63 of a cluster, a flux flow is produced both around the writing aperture 63 and around the writing and reading apertures 61 and 63. Upon the removal of the intense magnetizing force, the two different portions of the magnetic material limiting the reading aperture 61 are at opposite states of saturation at remanence (with reference to the reading aperture). This condition corresponds to the storage of a binary zero in a cluster, because a suitable magnetizing force applied to the magnetic material limiting the reading aperture 61 does not cause a flux flow around the reading aperture. A binary one is written into a selected cluster by applying a less intense magnetizing force to reverse the state of saturation at remanence (with reference to the reading aperture) of the portion of magnetic material common to a reading aperture 61 and a writing aperture 63. The wide portion of magnetic material common to the selected writing aperture 63 is brought close to the zero state of saturation at remanence.

The read-out may be accomplished by first applying an alternating magnetizing force whose amplitude, in one of its phases, is much larger than the amplitude in the other of its phases, to the magnetic material limiting a reading aperture 61. If a binary zero is stored in the selected cluster, a flux flow is not produced by the magnetizing force because the two portions of magnetic material limiting the reading aperture 61 of the selected cluster are in opposite states of saturation at remanence. If a binary one is stored in the selected cluster, a flux flow is produced. A flux flow around a reading aperture 61 induces a voltage in the read winding 67.

One or more (*n*) of the two-dimensional arrays 60 may be arranged with suitable read and write switches to form a three-dimensional memory system similar to that described in connection with Figure 3. The "*n*" arrays can be stacked in parallel with corresponding aligned reading apertures 61 being threaded by a separate read address wire, and corresponding aligned writing apertures 63 being threaded by a separate write address wire.

The overall arrangement of the "*n*" memory-digit planes 50 is the same as that shown in Figure 3 with the exception that each digit-storing cluster now comprises two apertures instead of three apertures. However, the mode of operation of the two aperture-storing clusters differs from the mode of operation of the three aperture-storing clusters, as described hereinafter.

In order to write a binary word consisting of a number of binary digits into a given memory position, the following procedure may be followed:

The D.C. bias current of the cores of the write switch is in a direction to maintain all the write cores at a given state of saturation. The write switch core at the desired memory position is addressed by applying current excitation to the one row coil and the one column coil which intersect in the selected write switch core. The addressed write switch core is driven, for example, from state P to state N, thereby causing a negative excitation current to flow in the coupled write address wire. The amplitude of the negative excitation current is sufficient to excite the narrow portions ($W_1$) and ($W_2$) of the clusters threaded by the coupled write address wire respectively to the states N and P of saturation at remanence (with reference to the reading aperture). The rate of removal of the current excitations from the write switch row and column coils is much slower than the rate at which they are applied. The D.C. biasing current returns the selected write core back to the state P, causing a positive excitation current of reduced amplitude to flow in the coupled write address wire. The reduced amplitude of the positive excitation current is insufficient to reverse the states of saturation at remanence of the portions W, $W_1$ and $W_2$ of the magnetic material of those clusters which are selected by the write address wire.

During the interval in which the positive excitation current is flowing in the write address wire, an additional positive excitation current is applied to the write winding 69 of those arrays in which a binary one is to be written. The amplitude of the additional positive excitation current, which is applied to the write winding of the selected arrays, is chosen such that the combined effect of the positive excitation current flowing in the selected write address wire and the positive excitation current flowing in the selected write windings is sufficient to reverse the state of saturation of the portion ($W_1$) to the state N of saturation at remanence (with reference to the reading aperture). The wide portion (W) is brought close to its zero state of saturation at remanence.

To read a memory position a read switch core is selected in the following manner: The D.C. bias current passing through the read switch cores maintains the cores at a given state of saturation at remanence. A read switch coil is addressed by applying current excitation to the row and column coils which intersect in the core. The selected read switch core is driven, for example, from state N to state P at a rate such that the voltage induced in the read address wire coupled to the selected read switch core causes a positive excitation current to flow in the coupled read address wire. The positive excitation current is of an amplitude sufficient only to establish a clockwise flux around the addressed reading apertures, i.e. those threaded by the read address wire which is coupled to the selected read switch core. A flux change is not produced by this positive excitation current in the addressed clusters in which a binary zero is stored. There is no change of flux because the portion $W_2$ of the magnetic material of the addressed clusters, which are storing a binary zero, is already saturated at remanence in the state P to which the positive excitation current tends to excite it.

A flux change is produced by the positive excitation current in the addressed clusters in which a binary one is stored. The flux flows around the shorter path including the reading aperture. Upon the termination of the positive excitation current, the narrow portions ($W_1$) and ($W_2$) of the addressed clusters, in which a binary one is stored, are reversed to the state P of saturation at remanence (with reference to the reading aperture). The flux change around the reading aperture of the clusters in which a binary one is stored induces a voltage in the read winding 67 of those arrays in which a binary one is stored in the addressed cluster.

In the addressed clusters in which a binary zero is stored, a negative excitation current does not cause a flux change around the reading aperture because the portion ($W_1$) of the magnetic material is already saturated in the state N of saturation at remanence. In the addressed clusters, in which a binary one is stored, the negative excitation current does cause a flux change around the reading aperture because both the portions ($W_1$) and ($W_2$) of the magnetic material are saturated in the state P of saturation at remanence. Thus, upon the termination of the negative excitation current, the portions ($W_1$) and ($W_2$) of the magnetic material are reversed to a state N of saturation at remanence.

A subsequent schedule of a positive excitation current pulse, followed by a negative excitation current pulse, flowing in a selected read address wire, again reverses the states of saturation at remanence of the portions ($W_1$) and ($W_2$) of the magnetic material of addressed clusters, in which a binary one is stored, respectively from state N to state P and back to state N. The wide portion of magnetic material of width (W) remains close to its zero state of saturation at remanence in the addressed clusters in which a binary one is stored. Likewise, the subsequent schedule of a positive excitation current pulse followed by a negative excitation current pulse, does not succeed in causing a flux change in the addressed clusters in which a binary zero is stored.

Note that in the situation where a two-aperture cluster is used for storing a binary digit, the first writing current pulse does interact in the reading circuit. Consequently, it is not practicable to provide for simultaneous write-in and read-out of two memory positions. However, the two-aperture storing cluster has other advantages in that a much larger power can be derived from the digit-plane read windings by employing one or more sequences of relatively large amplitude, positive excitation current pulse flowing in the read address wire which is coupled to the selected core of the read switch, followed by a smaller negative excitation current pulse. The larger positive pulse is in a direction not affecting the stored binary digit, and the smaller negative pulse is insufficient in amplitude to destroy the stored information but is sufficient to restore the state of saturation around the reading aperture 61.

The fabrication of the read and write windings on the surfaces of an array is simplified, in the case of the two aperture storing cluster, because only the two windings are required.

Figure 5*a* is a plan view view of a two-dimensional array according to another embodiment of the invention. A two-dimensional array comprising a plate 70 of rectangular hysteresis loop magnetic material, similar to that described in connection with Figure 1*a*, is provided. A binary digit storing cluster includes four different apertures as follows: a (D) dummy aperture 71, a first (R) reading aperture 73, a writing (W) aperture 75 and a second (R′) reading aperture 77. The plate 70 may be molded, for example, from the manganese-magnesium, ferrite material, to have a substantially uniform thickness and homogeneity.

A dummy winding 79, which is comprised of a conductive coating on the surfaces of the plate 70 and includes the inside wall of the apertures 71, links each of the dummy apertures 71 of the arrays. The winding 79 weaves back and forth through the dummy apertures 71 as shown. One end of the dummy winding 79 is connected to a conductor 81 and the other end of the dummy winding 79 is connected to a conductor 83.

A first read winding 85, which is comprised of a different conductive coating on the surfaces of the plate 70 including the inside walls of the first reading apertures 73, links the material limiting the first reading apertures 73 of the array, as shown. The winding 85 weaves back and forth through the first reading apertures 73. One end of the first read winding 85 is connected to a conductor 87 and the other end of the first read winding is connected to a conductor 89.

A write winding 91, which is comprised of another different conductive coating on the surfaces of the plate 70 including the inside walls of the writing apertures 75, links the material limiting each of the writing apertures of the array. The write winding 91 weaves back and forth through the writing apertures 75 of the array, as shown. One end of the write winding 91 is connected to a conductor 93 and the other end of the write winding 91 is connected to a conductor 95.

Likewise, the material limiting each of the second reading apertures 77 of the array is linked by a second read winding 97 which is comprised of still another conductive coating on the plate 70 including the inside walls of the second reading apertures 77. The winding 97 weaves back and forth through the second reading apertures 77 of the array, as shown. One end of the second read winding 97 is connected to a conductor 99, and the other end of the second read winding 97 is connected to a conductor 101.

Each dummy aperture 71 serves as a reference aperture for adjacent clusters of the array which are shown, by way of an example, to be located in a horizontal row (as viewed in the drawing).

The dummy apertures 71 also serve the additional function of the special spacer apertures used for isolation purposes, as described previously in connection with the embodiments illustrated in Figure 2*a* and Figure 4.

By employing a four-aperture cluster consisting of apertures 71, 73, 75, and 77, an output signal may be induced either in the first read winding 85 or the second read winding 97 in accordance with, or selectively in response to, the binary digit stored in a selected cluster. When a binary one is stored in a selected cluster, an output signal is induced in the first read winding 85. When a binary zero is stored in a selected cluster, an output signal is induced in the second read winding 97.

A method of storing a binary digit in a cluster, for example the cluster shown in the upper left-hand corner of the plate 70, may be as follows:

A positive excitation current (positive is taken as down into this upper left-hand aperture, that is, into the paper as viewed in Figure 5*a*) is applied to the dummy winding 79. The amplitude of this positive excitation current is made sufficient to establish a flux flow around each of the dummy apertures 71 threaded by the winding 79.

Upon removal of the positive excitation current, the portion of magnetic material common to the dummy aperture 71 and a second reading aperture 77, of the upper left-hand cluster, is at a state N of saturation at remanence (with reference to the reading aperture 77) and the portion of magnetic material, common to a dummy aperture 71 and a first reading aperture 73 of the cluster, is at a state P of saturation at remanence (with reference to the reading aperture 73). The application of the positive excitation current to the dummy winding 73 may be in the nature of a fabrication step.

If, now, a positive excitation current of suitable amplitude is applied to the write winding 91, a saturating flux in the clockwise sense is established around the writing aperture 75 of the upper left-hand cluster. Upon cessation of the positive excitation current, the portion of magnetic material, common to the first reading aperture 73 and the writing aperture 75 of the upper left-hand cluster, is at a state N of saturation at remanence (with reference to the aperture 73); and the portion of magnetic material, common to the second reading aperture 77 and the writing aperture 73, is at a state N of saturation at remanence (with reference to aperture 77).

Figure 5*b* is a cut-away plan view of a portion of the memory-digit plane 70 including the upper left-hand cluster. The arrows adjacent the different apertures indicate the states of saturation at remanence of the portions of magnetic material limiting the different apertures, after the positive excitation current is applied to the windings 79 and 91.

Note that the two different portions of the flux path around the second reading aperture 77 are both at a state N of saturation at remanence (with reference to aperture 77), while the portions of magnetic material limiting the first reading aperture 73 are at opposite states of saturation at remanence (with reference to aperture 73) with one portion at state N and the other portion at state P, as shown in Figure 5*b*.

Accordingly, if a magnetizing force of suitable amplitude and polarity is applied to the magnetic material limiting the second reading aperture 77 of Figure 5*b*, the state of saturation at remanence of the common portions of the magnetic material reverses to the state P, and a subsequent magnetizing force of opposite polarity changes the state of saturation at remanence of the common portions back to the original state N. However, neither polarity of the magnetizing force can produce a flux change around the first reading aperture 73 because the common portions are in opposite states of saturation at remanence.

Therefore, with the saturation at remanence configuration as shown in Figure 5*b*, a voltage is induced in the second read winding 97 when the magnetizing force is applied to the magnetic material limiting the second reading aperture 77, and no voltage is induced in the first reading winding 85 when the magnetizing force is applied to the magnetic material limiting the first reading aperture 73.

If, now, a negative excitation current is applied to the write winding 91, the state of saturation at remanence of the magnetic material limiting the writing aperture 75 of the upper lefthand cluster is reversed. With the flux configuration produced by a negative current, the magnetic material limiting the second reading aperture 77 cannot reverse, while the magnetic material limiting the first reading aperture 73 reverses. Consequently, an output voltage signal is induced in the first read winding 85 when a suitable magnetizing force is applied to the magnetic material limiting the first reading aperture 73, and no output voltage is induced in the second reading winding 97 when a like magnetizing force is applied to the magnetic material limiting the second reading aperture 77.

Thus, a binary one can be written into a selected cluster by applying a positive excitation current to the write winding 91, in which case an output voltage is induced in the second read winding 97 when the selected cluster is interrogated. A binary zero can be written into a selected cluster by applying a negative excitation current to the write winding 91, in which case an output voltage is induced in the first read winding 85 when the selected cluster is interrogated.

The read-out is non-destructive when a schedule of reading excitation current pulses, first of positive (P) and then of negative (N) polarity pulses, is employed because the state of saturation at remanence of the magnetic material limiting the responsive reading aperture is reversed by the P current pulse and returned to its original state by the N current pulse.

By connecting conductor 87 to conductor 101 in series opposition, two different pulse combinations may be obtained across the conductors 89 and 99 when a selected cluster is interrogated: one of the pulse combinations consists of a positive pulse followed by a negative pulse, and the other of the pulse combinations consists of a negative pulse followed by a positive pulse. For example, consider the upper left-hand cluster as shown in Figure 5*b*, with the states of saturation at remanence of the portions of magnetic material as shown by the respective arrows.

The P, N schedule of magnetizing forces is applied to the magnetic material limiting the first and second reading apertures of a selected cluster. When a binary one is stored in the selected cluster, as illustrated in Figure 5*b*, first a pulse of one phase, say positive, in response to the P magnetizing force, appears across the conductors 89 and 99 and, in response to the subsequent N magnetizing force, a negative pulse appears across the conductors 89 and 99. When a binary zero is stored in the selected cluster, the portions of the magnetic material limiting the first reading aperture 73 of the selected cluster reverse their states of saturation at remanence. When a binary zero is stored, the state of saturation at remanence of the common portions of the magnetic material limiting the first reading aperture 73 are opposite to the state of saturation at remanence of the common portions of the magnetic material limiting the second reading aperture 77, when a binary one is stored. Therefore, when a binary zero is stored in the selected cluster, first, a negative pulse, in response to the P magnetizing force, appears across the conductors 89 and 99, and in response to the subsequent N magnetizing force, a positive pulse appears across the conductors 89 and 99. The desired combinations can be obtained indefinitely because the common portions of magnetic material are returned to their initial state after each P, N schedule of interrogating magnetizing forces.

The above described method of obtaining combinations of output pulses is especially advantageous in that a spurious noise signal, due to the imperfection of the magnetic material, induced in the read winding is in a direction opposite to the desired signal. However, the amplitude of the desired signal is many times greater than the amplitude of the noise signal and, therefore, the noise signal is completely cancelled out. The net effect of the noise signal is to cause a small decrease in the amplitude of the desired signal.

Figure 6 is a plan view of an arrangement of a group of the two-dimensional arrays of Figure 5*a* in a three-dimensional memory system 100. A write switch 105 and a read switch 107 are provided. A cross-sectional view of the top row of switch cores of the write switch 105, and the top row of the clusters of one of the two-dimensional arrays comprising the plate 70, is shown for convenience of illustrating the wiring. Each of the arrays may be provided with one or more (*m*) clusters of apertures for storing *m* binary digits and one or more (*n*) of the two-dimensional arrays may be stacked in parallel. The *m* clusters of an array are arranged, for example, in a geometrical array, for example, in rows and columns, as shown in the drawing. A separate write address wire 109 is coupled to each switch core of the write switch 105. Each separate write address wire 109 is threaded through the write aperture 73 of a group *m* of the clusters. All the write address wires 109 are connected at the memory end of the system to a common connection 113, and to a common connection 119 at the write switch end of the system.

A separate read address wire 111 is coupled to each read core of the read switch 107. Each separate read address wire is threaded through the first reading aperture 73 of the group *m* of the clusters, then brought back through the second reading aperture 77 of the same group *m* of the clusters, to a common connection 115 at the memory end of the system. All the read address wires 111 are connected to a common connection 117 at the read switch end of the system.

Each of the two-dimensional arrays 70 is provided with a write winding, a first read winding, a second read winding, and a dummy winding as shown in detail in Figure 5*a*.

The first and second read windings may have separate connections in which case a voltage is induced in one, but not the other, when a selected cluster of an array is interrogated. Likewise, one end of the first read winding may be connected in series opposition to one end of the second read winding, in which case a combination of pulses is induced in the series-opposition-connected read winding when a selected cluster is interrogated.

One method of writing a binary word into a given memory position is to employ a schedule of P, N write current pulses by exciting a selected core of the write switch 105, as previously described in connection with Figure 3. During the time interval when the N current pulse is flowing in the write address wire 109, which is coupled to the selected core, an inhibiting positive excitation current is applied to the write winding of those arrays 70 in which a binary zero is to be stored in the selected cluster. Thus, the binary word is represented in the states of saturation of the portions of magnetic material limiting the first and second reading apertures 73 and 77, respectively.

A given memory position may be read or interrogated in a like manner. Activation of the selected core of the read switch 107 produces a positive polarity pulse followed by a negative polarity pulse, in the coupled read address wire 111. If the first and second read windings of the arrays 70 are separate, the positive current pulse causes a voltage to be induced in the second read winding of those arrays 70 in which a binary one is stored in the selected cluster, and a voltage to be induced in the first read winding of those arrays 70 in which a binary zero is stored in the selected cluster. The subsequent negative current pulse, flowing in the selected read address wire 111, returns the states of saturation at remanence of the portions of magnetic material limiting the first and second reading apertures of the selected clusters to their initial states of saturation at remanence.

In the situation where the first and second read windings of the arrays 70 are separate, the devices responsive to the signals induced in the first and second read windings, respectively, may be arranged to be non-responsive to the voltage pulses corresponding to the negative current excitation.

An example of such a device, typically, may be any of the flip-flop storage registers which are known in the computer arts.

If the first and second read windings of the arrays 70 are connected together in series opposition, the devices may be arranged to be responsive to only the first pulse of the combination of pulses induced in the read windings. An example of such a device is a two-input coincidence circuit triggered by a pair of positive pulses, where the first input is a positive clock pulse, and the second input is the first of the pair of pulses induced in the read windings of an array 70. When the first pulse induced in the read windings is positive, the coincidence device is triggered and, when the first pulse induced in the read windings of an array is negative, the coincidence device is not triggered.

There have been described herein improved random-access memory systems for storing binary words or a plurality of binary digits simultaneously, and for retaining these stored words or digits indefinitely, notwithstanding repeated interrogation. The improved memory systems are faster than previous random-access memory systems since they do not require a feedback or restoring loop to retain the information stored therein.

The two-dimensional arrays are relatively inexpensive to fabricate and the printing of the write, read, and dummy windings is comparatively simple. Therefore, fast, random-access memory systems of large capacity are greatly reduced in cost.

The various embodiments of the present invention include two, three and four-aperture storing clusters, and means are described for obtaining various combinations of output signals.

The 4 x 4 array of clusters was illustrated for convenience. Other larger arrays may be employed within the scope of the present invention. The checkerboard winding is an example of a winding technique convenient to fabricate. Other winding schemes, for instance, a separate $x$—$y$ winding for each memory-digit plane, may be employed. The two-dimensional array was illustrated as a flat plate of the magnetic material; however, it is understood that the digit-storing clusters may be employed in various different arrangements within the scope of the present invention.

The improved memory system described herein provides a means for further reducing the operational time of a random-access memory by simultaneous write-in and read-out of information to and from different memory positions. The simultaneous write-in and read-out allows a greater flexibility in the use of a magnetic memory system.

What is claimed is:

1. In a magnetic memory system, the combination comprising a plurality of memory digit planes, each plane being fabricated from a magnetic material having the characteristic of being substantially saturated at remanence, and having a plurality of apertures arranged in clusters, said clusters being arranged in rows and columns, each of said clusters having at least a writing aperture and a reading aperture, a separate flux path about each aperture of a cluster, said writing and reading apertures being located in said material to provide a portion of said material common to each of said separate flux paths, adjacent clusters in a row being separated by a spacing aperture, said planes being spaced from each other and having corresponding clusters of apertures substantially aligned, first switch means having a plurality of output coils each of which links the magnetic material limiting the writing aperture of a group of aligned clusters, and second switch means having a plurality of output coils each of which links the magnetic material limiting the reading aperture of a group of aligned clusters.

2. In a magnetic memory system, the combination as recited in claim 1, wherein each of said clusters includes only a writing aperture and a reading aperture.

3. In a magnetic memory system, the combination as recited in claim 1 wherein each of said clusters includes a dummy aperture, said dummy aperture being located in said material to provide another portion of said material common to said flux paths about said reading and dummy apertures.

4. In a magnetic memory system, the combination as recited in claim 1, wherein each of said clusters includes a second reading aperture said second reading aperture being located in said material to provide another portion of said material common to said flux paths about said writing and second reading apertures, each of said memory digit planes having a separate first read winding threading each of a respective one of said two reading apertures, and a separate second read winding threading each of the said second reading apertures.

5. In a magnetic memory system, the combination as recited in claim 4, wherein said separate first and second read windings are connected in series opposition.

6. A magnetic memory system comprising a plurality of memory digit planes, each plane being fabricated from magnetic material having the characteristic of being substantially saturated at remanence and having a plurality of apertures arranged in clusters, said clusters individually identifiable as corresponding to the elements of an array arranged in rows and columns, each of said clusters having at least a writing aperture and a reading aperture, a separate flux path about each aperture of a cluster, said writing and reading apertures being located in said material to provide a portion of said material common to said flux paths about said reading and writing apertures, adjacent clusters in a row being separated by a spacing aperture, said planes being spaced from each other and having corresponding clusters of apertures substantially in register, each memory digit plane having a separate write winding threading each writing aperture and a separate read winding threading each reading aperture, means to selectively excite the portions of magnetic material limiting the writing aperture of a group of aligned clusters to opposite states of saturation at remanence, and means to selectively excite the portions of magnetic material limiting the writing aperture of certain ones of said group of aligned clusters to the same state of saturation at remanence.

7. A magnetic memory system as recited in claim 6 wherein each of said clusters includes a dummy aperture, said dummy aperture being located in said material to provide another portion of said material common to said flux paths about said reading and dummy apertures, and each of said memory digit planes has a separate dummy winding threading each dummy aperture.

8. A system comprising magnetic core storage elements having the characteristic of being substantially saturated at remanence, means for storing information in a selected group of said elements, and means for reading the stored information from another selected group of said elements, said means being simultaneously operable.

9. A magnetic memory system comprising a plurality of devices each comprising magnetic material having the characteristic of being substantially saturated at remanence and the said material of each having a cluster of apertures, a flux path about each said aperture, said apertures being located in said material to provide a portion of said material common to two different ones of said paths, means to apply through one aperture of each said cluster a writing pulse of current, means to apply through another aperture of each said cluster an alternating excitation current for non-destructive change of flux detectable for read-out in response to a previous writing pulse, means to select a cluster for application of said writing pulse, and means to select a different cluster for application of said excitation current, said selecting means and said application means being operable simultaneously for simultaneous write-in and read-out.

10. A magnetic memory system comprising a plurality of memory digit planes, each plane being fabricated from a magnetic material having the characteristic of being substantially saturated at remanence, and each said plane having a plurality of apertures arranged in clusters, said clusters being individually identifiable as corresponding to the elements of an array arranged in rows and columns, each of said clusters including at least a writing and two reading apertures, a flux path about each said aperture, said apertures being located in said material to provide different portions of said material respectively in common with the flux path about said writing aperture and the flux paths about said two reading apertures, each said plane having a plurality of dummy apertures, individual ones of said dummy apertures being located in said material between respective pairs of said clusters each dummy aperture providing two portions of material, one of said two portions being in common with a portion of said material about a reading aperture of one cluster of said pair, and the other of said two portions being in common with a portion of said material about a reading aperture of the other cluster of said pair, said planes being spaced from each other and having corresponding clusters of apertures substantially in register, and means to selectively excite the portions of magnetic material limiting the writing aperture of certain ones of said group of aligned clusters to the same state of saturation at remanence.

11. A system comprising storage elements each consisting of a body of magnetic material having the characteristic of being substantially saturated at remanence, the remanent magnetic state of a certain portion of which is representative of information stored in that element including said portion, and means for reading the stored information from at least one of a selected group of said elements by reversing the remanent flux in a portion of said one element other than said certain portion and simultaneously preserving the said magnetic state of each portion of said group representative of the stored information, whereby the said reading is non-destructive.

12. A system comprising storage elements each consisting of a body of magnetic material having the characteristic of being substantially saturated at remanence, means responsive to information to be stored for applying a magnetizing force to a certain portion of said material of each element, the remanent magnetic state of said portion of each being representative of the information stored in that element including said portion, and means for reading the stored information from at least one of a selected group of said elements by reversing the remanent flux in a portion of said one element other than said certain portion and simultaneously preserving the said state of said portion of each element of said group, whereby the said reading is non-destructive of said information.

13. A magnetic memory system comprising a plurality of devices each comprising magnetic material having the characteristic of being substantially saturated at remanence, the said magnetic material of each said device having a cluster of at least two apertures, one of said apertures being a writing aperture, and the other being a reading aperture, a separate flux path about each of said apertures, said writing and reading apertures being located in said material to provide a portion of said material common to the said flux paths about said writing and reading apertures means for writing information into the magnetic material limiting said writing aperture of at least one device of a selected group of said devices, and means for reading information stored in the magnetic material limiting said reading aperture of at least one device of another selected group of said devices, said means for writing and reading information being simultaneously operable.

14. A system as claimed in claim 13, the said material of said devices being in a continuous plate.

15. A system as claimed in claim 14, the said plate being planar.

16. A system as claimed in claim 13, the said clusters being arranged in a two-dimensional array.

17. A system as claimed in claim 13, the said clusters being arranged in a three-dimensional array.

18. A system as claimed in claim 13, said clusters being arranged in two or more two-dimensional arrays, each said two-dimensional array having a cluster in a position of correspondence to a cluster in each other two-dimensional array, each said device of any selected group comprising clusters of corresponding position in each two-dimensional array.

19. A system as claimed in claim 13, each said means for writing and reading information including a magnetic switch.

20. A system as claimed in claim 13, said means for reading including means for applying alternating current to said other devices.

21. A magnetic memory system comprising a plurality of memory planes, each memory plane comprising a magnetizable medium having the characteristic of being substantially saturated at remanence, each said memory plane having a two-dimensional array of clusters of apertures therein for the storage of information in the medium adjacent each said cluster, a separate flux path about each separate aperture of a cluster, a first and a second of said apertures of each cluster being located in said medium to provide a portion thereof common to the said flux paths about said first and second apertures, means for selecting at least one cluster of said array either for writing information into the medium adjacent said selected cluster, or for reading out information therefrom, and means for passing magnetizing current through said first aperture of said selected cluster when writing information into said medium for storage, and for passing alternating magnetizing current through said second aperture of said selected cluster for reading out the stored information.

22. A system according to claim 21, wherein each cluster includes three different apertures, said third aperture being located in said medium to provide another portion common to the said flux paths about one of said two apertures and said third aperture.

23. A system according to claim 21, wherein each cluster includes two different apertures.

24. A system according to claim 21, wherein each cluster includes four different apertures, the third of said apertures being located in said medium to provide a portion of said medium common to the said flux paths about one of said two apertures and said third aperture, and said fourth aperture being located in said medium to provide another portion of said medium in common with the said flux paths about said first and said fourth apertures.

25. A system according to claim 21, wherein said selecting means includes a separate write switch having outputs and a separate read switch having outputs, the outputs of said read and write switches being threaded through different apertures in each of said clusters.

26. A magnetic memory system comprising a plurality of memory digit planes, each plane comprising a magnetic material having the characteristic of being substantially saturated at remanence and having a plurality of apertures arranged in clusters therein, said clusters individually identifiable as corresponding to the elements of an array arranged in rows and columns, each of said clusters having at least a writing aperture and a reading aperture, a flux path about each said aperture, said writing and reading apertures being located in said material to provide a portion thereof common to said flux paths about said writing and reading apertures, said planes being spaced from each other and having corresponding clusters of apertures substantially in register, each memory digit plane having a separate write winding threading each writing aperture and a separate read winding threading each reading aperture, means to selectively excite the portions of magnetic material limiting the writing aperture of a group of aligned clusters to opposite states of saturation at remanence, and means to selectively excite the portions of magnetic material limiting the writing aperture of certain ones of said group of aligned clusters to the same state of saturation at remanence.

27. A magnetic memory system comprising a plurality of memory digit planes, each plane comprising a magnetic material having the characteristic of being substantially saturated at remanence and having a plurality of apertures therein arranged in clusters, said clusters individually identifiable as corresponding to the elements of an array arranged in rows and columns, each of said clusters having a writing aperture, first and second reading apertures and a dummy aperture, a separate flux path about each said aperture, said writing and said reading apertures being located in said material to provide different portions there of respectively in common with said flux path about said writing aperture and said flux paths about said first and second reading apertures, and said dummy aperture being located in said material to provide another portion thereof in common with said flux path about said dummy aperture and said flux path about one of said first and second reading apertures, said planes being spaced from each other and having corresponding clusters of apertures substantially in register, each memory digit plane having a separate write winding threading each writing aperture, separate first and second read windings threading said first and second reading apertures and a separate dummy winding threading each dummy aperture, said dummy winding alternately threading successive ones of said dummy apertures in the one and the other directions, means to selectively excite the portions of magnetic material limiting the writing aperture of a group of aligned clusters to opposite states of saturation at remanence, and means to selectively excite the portions of magnetic material limiting the writing aperture of certain ones of said group of aligned clusters to the same state of saturation at remanence.

28. A magnetic memory system as recited in claim 27, wherein said write, read and dummy windings are constituted by separate conductive coatings.

29. A memory digit plane comprising magnetic material having the characteristic of being substantially saturated at remanence and having a plurality of apertures therein arranged in clusters, said clusters individually identifiable as corresponding to the elements of an array arranged in rows and columns, each of said clusters including a writing aperture and a reading aperture, said writing and reading apertures of any one cluster defining three separate legs, one leg being between said writing and reading apertures and the other two being on either side of said writing and reading apertures, the cross-sectional area of said one leg being at least equal to the cross-sectional area of either of the other legs, adjacent ones of said clusters being spaced from each other by a distance at least equal to said one leg means for storing information by setting the remanent flux in the said legs on either side of the writing aperture of a selected one of said clusters, and means for applying a reading signal through the said reading aperture of said selected cluster to read the information stored in that cluster.

30. A memory digit plane as claimed in claim 29, including a plurality of spacing apertures, adjacent ones of said clusters of said rows being separated from each other by a different said spacing aperture.

31. A magnetic memory system comprising a plurality of memory digit planes, each plane being fabricated from a magnetic material having the characteristic of being substantially saturated at remanence, and having a plurality of apertures arranged in clusters, said clusters being individually identifiable as corresponding to the elements of an array arranged in rows and columns, each of said clusters having at least a writing aperture and a reading aperture, a separate flux path about each aperture of a cluster, said writing and reading apertures being located in said material to provide a portion of said material common to said reading and writing aperture flux paths, adjacent clusters in a row being separated by a spacing aperture, said planes being spaced from each other and having corresponding clusters of apertures substantially aligned, and means to selectively excite the portions of magnetic material limiting the writing apertures of certain ones of said group of aligned clusters to the same state of saturation at remanence.

32. A magnetic memory system comprising a plurality of memory digit planes, each plane being fabricated from a magnetic material having the characteristic of being substantially saturated at remanence, and having a plurality of apertures arranged in clusters, said clusters being individually identifiable as corresponding to the elements of an array arranged in rows and columns, each of said clusters having a writing aperture, a reading aperture, and a dummy aperture, a separate flux path about each aperture of a cluster, said apertures being located in said material to provide different portions respectively in common with said flux path about said reading aperture and said flux paths about said writing and dummy apertures, adjacent clusters in a row being separated by a spacing aperture, said planes being spaced from each other and having corresponding clusters of apertures substantially aligned, and means to selectively excite the portions of magnetic material limiting the writing apertures of certain ones of said group of aligned clusters to the same state of saturation at remanence.

33. A magnetic memory system comprising a plurality of memory digit planes, each plane being fabricated from a magnetic material having the characteristic of being substantially saturated at remanence, and having a plurality of aperture arranged in clusters, said clusters being individually identifiable as corresponding to the elements of an array arranged in rows and columns, each of said clusters having a writing aperture, two reading apertures, and at least one dummy aperture, said writing and reading apertures being located in said material to provide different portions of said material respectively in common with the flux path about said writing aperture and the flux paths about said two reading apertures, and said dummy aperture being located in said material to provide a portion of said material common to said flux paths about said dummy and one of said reading apertures, adjacent clusters in a row being separated by a spacing aperture, said planes being spaced from each other and having corresponding clusters of apertures substantially aligned, and means to selectively excite the portions of magnetic material limiting the writing apertures of certain ones of said group of aligned clusters in the same state of saturation at remanence.

34. In a magnetic memory system, the combination comprising a plurality of memory digit planes, each plane being fabricated from a magnetic material having the characteristic of being substantially saturated at remanence, and having a plurality of apertures arranged in clusters, said clusters being arranged in rows and columns, each of said clusters having a writing aperture, first and second reading apertures, and at least one dummy aperture, a separate flux path about each of said apertures, said writing aperture being located in said material with respect to said first and second reading apertures to provide different portions of said material respectively in common with said writing aperture flux path and said first and second reading aperture flux paths, and said dummy aperture being located in said material to provide another portion of said material in common with said flux paths about said dummy aperture and one of said reading apertures, adjacent clusters in a row being separated by a spacing aperture, said planes being spaced from each other and having corresponding clusters of apertures substantially aligned, first switch means having a plurality of output coils, each linking the magnetic material limiting the writing apertures of a different group of aligned clusters, and second switch means having a plurality of output coils each linking the magnetic material limiting the reading apertures of a different group of aligned clusters.

References Cited in the file of this patent

UNITED STATES PATENTS

| | | |
|---|---|---|
| 2,614,167 | Kamm | Oct. 14, 1952 |
| 2,700,703 | Nordyke | Jan. 25, 1955 |
| 2,701,095 | Stibitz | Feb. 1, 1955 |
| 2,724,103 | Ashenhurst | Nov. 15, 1955 |
| 2,732,542 | Minnick | Jan. 24, 1956 |
| 2,741,757 | Devol et al. | Apr. 10, 1956 |
| 2,784,391 | Rajchman | Mar. 5, 1957 |
| 2,902,676 | Brown | Sept. 1, 1959 |

OTHER REFERENCES

Publication I entitled "Edvac Progress Report #2," June 30, 1946 (pages PY-0-164, PY-0-165, 4-22, 4-23).

Publication II entitled "Thesis on Magnetic Cores," by M. K. Haynes, Dec. 28, 1950 (pages 21 and 22).

Publication III entitled "The MIT Magnetic Core Memory," by Papian in Proceedings of the Eastern Joint Computer Conference, Dec. 8-10, 1953 (pages 37-40).

Publication IV entitled "Nondestructive Sensing of Magnetic Cores," by Buck and Frank in Electrical Engineering, February 1954 (page 110).

Publication V "Ferrites Speed Digital Computers" (Brown), Electronics Magazine, April 1953 (pages 146-149) (Fig. 2, page 147 relied on).